US 8,526,724 B2

(12) United States Patent
Wang et al.

(10) Patent No.: US 8,526,724 B2
(45) Date of Patent: Sep. 3, 2013

(54) IN-IMAGE ACCESSIBILITY INDICATION

(75) Inventors: Meng Wang, Singapore (SG); Yelong Sheng, Beijing (CN); Xian-Sheng Hua, Beijing (CN)

(73) Assignee: Microsoft Corporation, Redmond, WA (US)

( * ) Notice: Subject to any disclaimer, the term of this patent is extended or adjusted under 35 U.S.C. 154(b) by 380 days.

(21) Appl. No.: 12/948,519

(22) Filed: Nov. 17, 2010

(65) Prior Publication Data

US 2012/0121172 A1    May 17, 2012

(51) Int. Cl.
*G06K 9/00*    (2006.01)

(52) U.S. Cl.
USPC ............ 382/165; 382/162; 382/167; 382/274

(58) Field of Classification Search
USPC ................. 382/162, 165, 167, 260, 299, 274; 348/453; 345/589, 600, 605; 707/748
See application file for complete search history.

(56) References Cited

U.S. PATENT DOCUMENTS

| 7,394,468 | B2 | 7/2008 | Hofman et al. | |
|---|---|---|---|---|
| 2003/0095705 | A1 | 5/2003 | Weast | |
| 2010/0185624 | A1* | 7/2010 | Wang et al. | 707/748 |
| 2010/0321400 | A1* | 12/2010 | Miyahara | 345/600 |
| 2012/0041782 | A1* | 2/2012 | Morris | 705/3 |

OTHER PUBLICATIONS

"Accessibility Research, aDesigner", retrieved on Sep. 7, 2010 at <<http://www.research.ibm.com/trl/projects/acc_tech/adesigner.htm>>, IBM Research—Tokyo, 2010, pp. 1-2.

Brettel, et al., "Computerized simulation of color appearance for dichromats", retrieved on Aug. 26, 2010 at <<http://vision.psychol.cam.ac.uk/jdmollon/papers/Dichromatsimulation.pdf>>, Journal of The Optical Society of America, vol. 14, No. 10, Oct. 1997, pp. 2647-2655.

Flatla, "A Predictive Model of Colour Differentiation", retrieved on Aug. 26, 2010 at <<http://www.hci.usask.ca/uploads/172-thesis.pdf>>, University of Saskatchewan, Master's Thesis, May 2009, pp. 1-157.

Flatla, et al., "Individual Models of Color Differentiation to Improve Interpretability of Information Visualization", retrieved on Aug. 26, 2010 at <<http://hci.usask.ca/uploads/171-pap0861-flatla.pdf>>, ACM, Proceedings of International Conference on Human Factors in Computing Systems (CHI), Atlanta, Georgia, Apr. 2010, pp. 2563-2572.

Huang, et al., "Enhancing Color Representation for the Color Vision Impaired", retrieved on Aug. 26, 2010 at <<http://hal.archives-ouvertes.fr/docs/00/32/19/36/PDF/EnhancingColor.pdf>>, Proceedings of ECCV Workshop on Computer Vision Applications for the Visually Impaired (CVAVI), Marseille, France, 2008, pp. 1-12.

(Continued)

*Primary Examiner* — Ali Bayat
(74) *Attorney, Agent, or Firm* — Lee & Hayes, PLLC (57) ABSTRACT

Methods and systems for in-image accessibility indication are described herein. These methods and systems are usable to receive an image being designed, locate colorblind inaccessible regions of the image based on located colorblind inaccessible points, and indicate the located colorblind inaccessible regions in the image to a designer while the designer is creating the image. As such, the designer is able to quickly identify regions of the designed image that may be difficult for colorblind viewers to see and, with this information, the designer is able to modify the image accordingly.

20 Claims, 7 Drawing Sheets

(56) References Cited

OTHER PUBLICATIONS

Huang, et al., "Information Preserving Color Transformation for Protanopia and Deuteranopia", retrieved on Aug. 26, 2010 at <<http://ieeexplore.ieee.org/stamp/stamp.jsp?tp=&arnumber=4303068>>, IEEE Signal Processing Letters, vol. 14, No. 10, Oct. 2007, pp. 711-714.

Iaccarino, et al., "Efficient Edge-Services for Colorblind Us", retrieved on Aug. 26, 2010 at <<http://www2006.org/programme/files/pdf/p147.pdf>>, ACM, Proceedings of International Conference on World Wide Web (WWW), Edinburgh, Scotland, May 2006, pp. 919-920.

Jefferson, et al., "An Interface to Support Color Blind Computer Users", retrieved on Aug. 26, 2010 at <<http://citeseerx.ist.psu.edu/viewdoc/download?doi=10.1.1.107.8159&rep=rep1&type=pdf>>, ACM, Proceedings of International Conference on Human Factors in Computing Systems (CHI), San Jose, California, 2007, pp. 1-4.

Kuhn, "Image Recoloring for Color-Vision Deficients", retrieved on Aug. 26, 2010 at <<http://www.inf.ufrgs.br/~oliveira/students_dissertations/Masters/Giovane_Kuhn_Masters_thesis_UFRGS_2008.pdf>>, Universidade Federal do Rio Grande do Sul, Master's Thesis, Apr. 2008, pp. 1-61.

Liu, et al., "Efficient Image and Video Re Coloring for Colorblindness", retrieved on Aug. 26, 2010 at <<http://ieeexplore.ieee.org/stamp/stamp.jsp?arnumber=05202642>>, IEEE Proceedings of International Conference on Multimedia and Expo (ICME), New York, NY, 2009, pp. 906-909.

Marr, "Vision", retrieved on Aug. 25, 2010 at <<http://www.jimdavies.org/summaries/marr1982.html>>, Freeman Publishers, 1982, 2 pages.

Moreno, et al., "Disability Standards for Multimedia on the Web", retrieved on Aug. 26, 2010 at << http://ieeexplore.ieee.org/stamp/stamp.jsp?tp=&arnumber=4740388>>, IEEE Computer Society, MultiMedia, vol. 15, No. 4, 2008, pp. 52-54.

Nam, et al., "Visual Content Adaptation According to User Perception Characteristics", retrieved on Aug. 26, 2010 at <<http://ieeexplore.ieee.org/stamp/stamp.jsp?tp=&arnumber=1430719>>, IEEE Transactions on Multimedia, vol. 7, No. 3, Jun. 2005, pp. 435-445.

Rasche, et al., "Detail Preserving Reproduction of Color Images for Monochromats and Dichromats", retrieved on Aug. 26, 2010 at <<http://ieeexplore.ieee.org/stamp/stamp.jsp?tp=&arnumber=1438255>>, IEEE Computer Society, Multimedia, 2005, pp. 22-30.

Rasche, et al., "Re-coloring Images for Gamuts of Lower Dimension", retrieved on Aug. 26, 2010 at <<http://citeseerx.ist.psu.edu/viewdoc/download?jsessionid=A21DB7AEE351A79BA2A91B3205B320B3?doi=10.1.1.89.7999&rep=rep1&type=pdf>>, The Eurographics Association and Blackwell Publishing, Computer Graphics Forum: Eurographics, vol. 24, No. 3, 2005, pp. 423-432.

"Vischeck", retrieved on Aug. 26, 2010 at <<http://www.vischeck.com>>, Nov. 11 2008, pp. 1.

Wakita, et al., "SmartColor: Disambiguation Framework for the Colorblind", retrieved on Aug. 26, 2010 at <<http://www.csie.nctu.edu.tw/~lbhsiuh/smartcolor.pdf>>, ACM, Proceedings of International Conference on Computers and Accessibility (ASSETS), Baltimore, Maryland, Oct. 2005, pp. 158-165.

Wang, et al., "Accessible Image Search", retrieved on Aug. 27, 2010 at <<http://74.125.155.132/scholar?q=cache:Uicb1Hd8GEAJ:scholar.google.com/&hl=en&as_sdt=2000>>, ACM, Proceedings of International Conference on Multimedia (MM), Beijing, China, Oct. 2009, pp. 291-300.

Xu, et al., "Survey of Clustering Algorithms", retrieved on Aug. 26, 2010 at <<http://ieeexplore.ieee.org/stamp/stamp.jsp?tp=&arnumber=1427769>>, IEEE Transactions on Neural Networks, vol. 16, No. 3, May 2005, pp. 645-678.

Yang, et al., "Visual Content Adaptation for Color Vision Deficiency", retrieved on Aug. 26, 2010 at <<http://ieeexplore.ieee.org/stamp/stamp.jsp?tp=&arnumber=1246996>>, IEEE, Proceedings of International Conference on Image Processing (ICIP), Sep. 2003, pp. I-453 to I-456.

* cited by examiner

IN-IMAGE ACCESSIBILITY INDICATION

BACKGROUND

Graphic designers continually endeavor to produce items that best capture a wide variety of viewer's attention. To this end, graphic designers have access to numerous graphic design products. In utilizing these graphic design products, these designers manipulate their images to produce a desired effect. However, many traditional graphic design products do not apprise the designer of the fact that about 5% of the designer's viewing population is colorblind and, hence, possibly unable to view their design. Specifically, about 8% of men and 0.8% of women suffer from colorblindness and, as a result, are often unable to recognize certain regions or objects in the designer's image. Further, while some of the regions or objects in the image may be non-critical information, such as purely aesthetic information, some of these regions or objects may contain highly-critical information. For example, the regions or objects in the image may contain information that is necessary for colorblind viewer's understanding.

While there exists products that directly show image designers the simulated colorblind views of images, these products require the image designers to check the designed images every time the designed image is revised. This problem is exacerbated when the designer is designing slides, in that the designer would need to check each and every slide for colorblind regions or objects. Therefore, these products are time consuming and labor intensive.

SUMMARY

This summary is provided to introduce simplified concepts for in-image accessibility indication, which are further described below in the Detailed Description.

This summary is not intended to identify essential features of the claimed subject matter, nor is it intended for use in determining the scope of the claimed subject matter. Generally, the in-image accessibility indication described herein comprises receiving an image being created by a designer and identifying, to the designer, inaccessible regions within the image that a colorblind viewer cannot ascertain based on determined inaccessible points. Inaccessible points are defined as the points around which patches are not prominent enough for colorblind viewers due to the loss of color information.

In one implementation, the in-image accessibility indication techniques may generate simulated colorblind views of the image. In this implementation, the techniques may determine inaccessible points based on information loss between the simulated colorblind view and the image to locate inaccessible regions.

In another implementation, the techniques may generate a set of gradient maps of the colorblind views of the image. Here, the techniques described below may determine inaccessible points based on information loss between a gradient map and another gradient map of the set of gradient maps. The identified points may then be used to locate inaccessible regions.

In some implementations, the techniques may generate a set of colorblind and non-colorblind gradient maps. For example, the techniques may generate simulated colorblind views, non-colorblind gradient maps of the original image, colorblind gradient maps of the simulated colorblind views, and full colorblind gradient maps of the simulated colorblind views. Here, the techniques may determine inaccessible points based on information loss between the non-colorblind gradient map and the colorblind gradient map to locate inaccessible regions. For example, the techniques may determine a difference between the non-colorblind gradient map and the colorblind gradient map and subsequently determine if the difference is greater than a predefined threshold. If the difference is greater than a predefined threshold, then the information loss is significant enough that a colorblind viewer may not be able to recognize these points. Further, along with determining a difference between the non-colorblind gradient map and the colorblind gradient map, the techniques may determine inaccessible points based on a prominence of the full colorblind gradient map. For example, the techniques may determine if the values of respective points located at respective points of information loss in the full colorblind gradient map are less than another pre-defined threshold. If the values of the points are less than the other pre-defined threshold, then these points are inaccessible to a colorblind viewer.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

This disclosure describes providing an in-image accessibility indication to a designer of an image, such as still image, an animation, a video, and the like. In particular, systems and methods are described for receiving an image being designed by a designer, locating inaccessible regions of the image based on located inaccessible points, and indicating these located inaccessible regions in the image to the designer while the designer is creating the image. In some implementations, the in-image accessibility indication may generate simulated colorblind views of the image. Additionally or alternatively, the in-image accessibility indication may generate gradient maps based on the image. In other examples, the in-image accessibility indication may generate gradient maps based on dichromate viewers.

As discussed above, while products that directly show image designers simulated colorblind views of a completed image exist, the approach taken by these products is inefficient for the designer. Accordingly, there is a need for in-image accessibility indication that indicates, to a designer, colorblind inaccessible regions in an image that the designer currently or immediately designs. That is, a need exists to signal to the designer the potential that color-blind viewers may not be able to view certain regions of an image, while the graphic designer actually engages in the process of designing the image.

While the techniques described in this disclosure may be described with respect to images such as poster images, slide images, logo images, etc., other forms of images are contemplated. For example, the techniques described in this disclosure may be described with respect to images such as video images, film images, or the like.

Illustrative In-Image Accessibility Indication System

Figure 1:
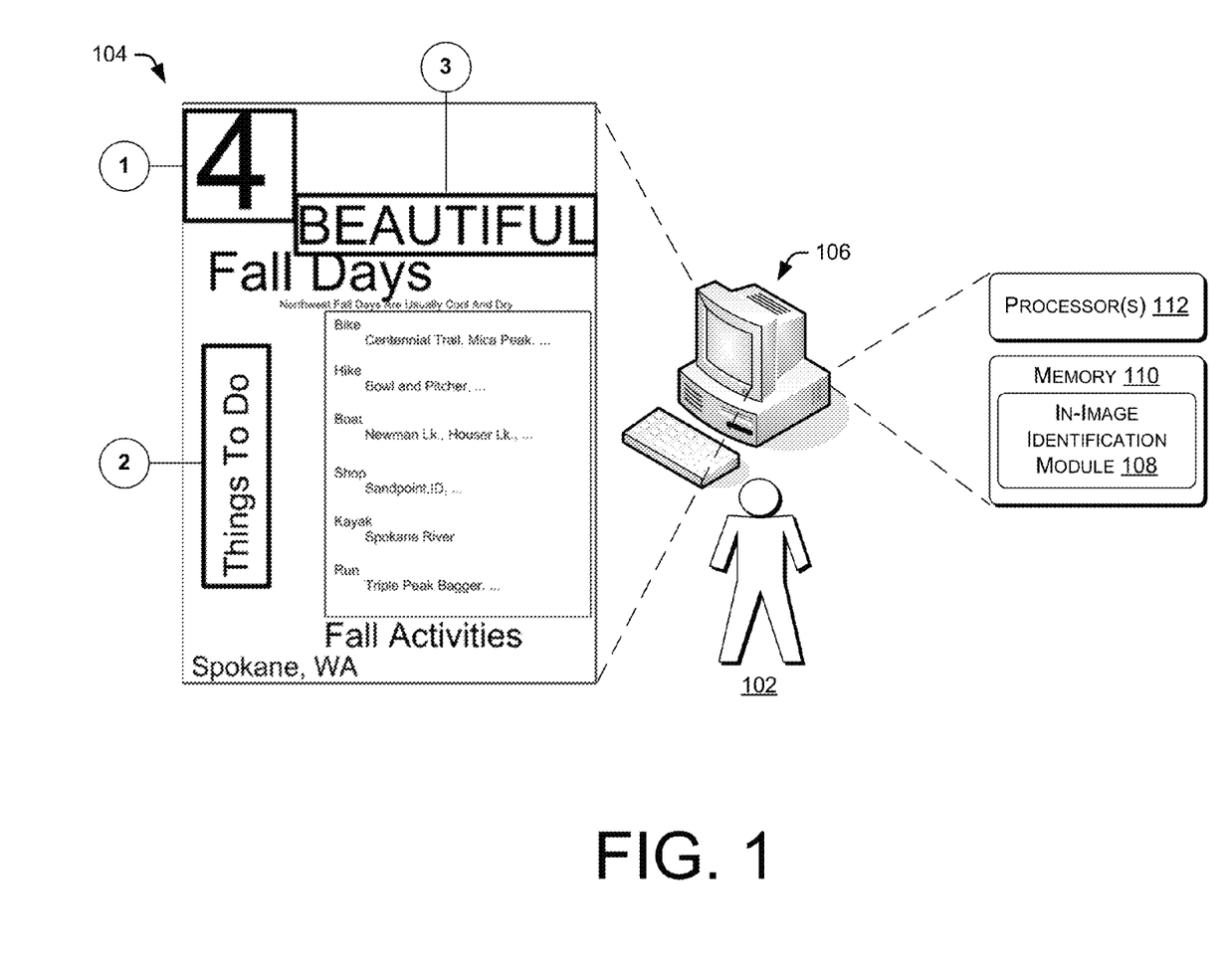
FIG. 1 represents an illustrative image being created by a designer utilizing a computing system comprising an in-image accessibility indication module.

FIG. 1 represents an illustrative image being created by a designer utilizing a computing system that includes an in-image accessibility indication module that indicates to the designer which regions, if any, of an image that the designer currently designs may not be viewable by a colorblind view. In some instances, the in-image accessibility indication module provides this indication to the designer while he or she designs the image and without action by the designer. By way of example only, a designer 102 is illustrated as creating a poster image 104 utilizing a computing device 106 comprising an in-image identification module 108 stored in memory 110 and executable by processor(s) 112. While FIG. 1 illustrates a designer 102 utilizing a computing device 106, the designer may utilize, in combination or alternatively, other computing devices comprising in-image identification functionality. For example, a designer may utilize via the internet a remote computing device (e.g., a server) that is configured with an in-image identification module to create the image. Alternatively or additionally, a designer may utilize a cloud computing network configured with in-image identification functionality to identify, to the designer, colorblind inaccessible regions in the image.

FIG. 1 illustrates that the module 108 may identify to the designer 102 that the following three regions in the poster image 104 are inaccessible to colorblind viewers: inaccessible region one (1), inaccessible region two (2), and inaccessible region three (3). While FIG. 1 illustrates three inaccessible regions being in the image 104, any number of inaccessible regions may be indicated in the image 104. For example, the in-image identification module 108, may indicate one inaccessible region, five inaccessible regions, ten inaccessible regions, no inaccessible regions, or any other number. Further, the in-image identification module 108 may indicate an optimized number of regions based on a size and a quantity of inaccessible regions for indication in the image 104.

Figure 2:
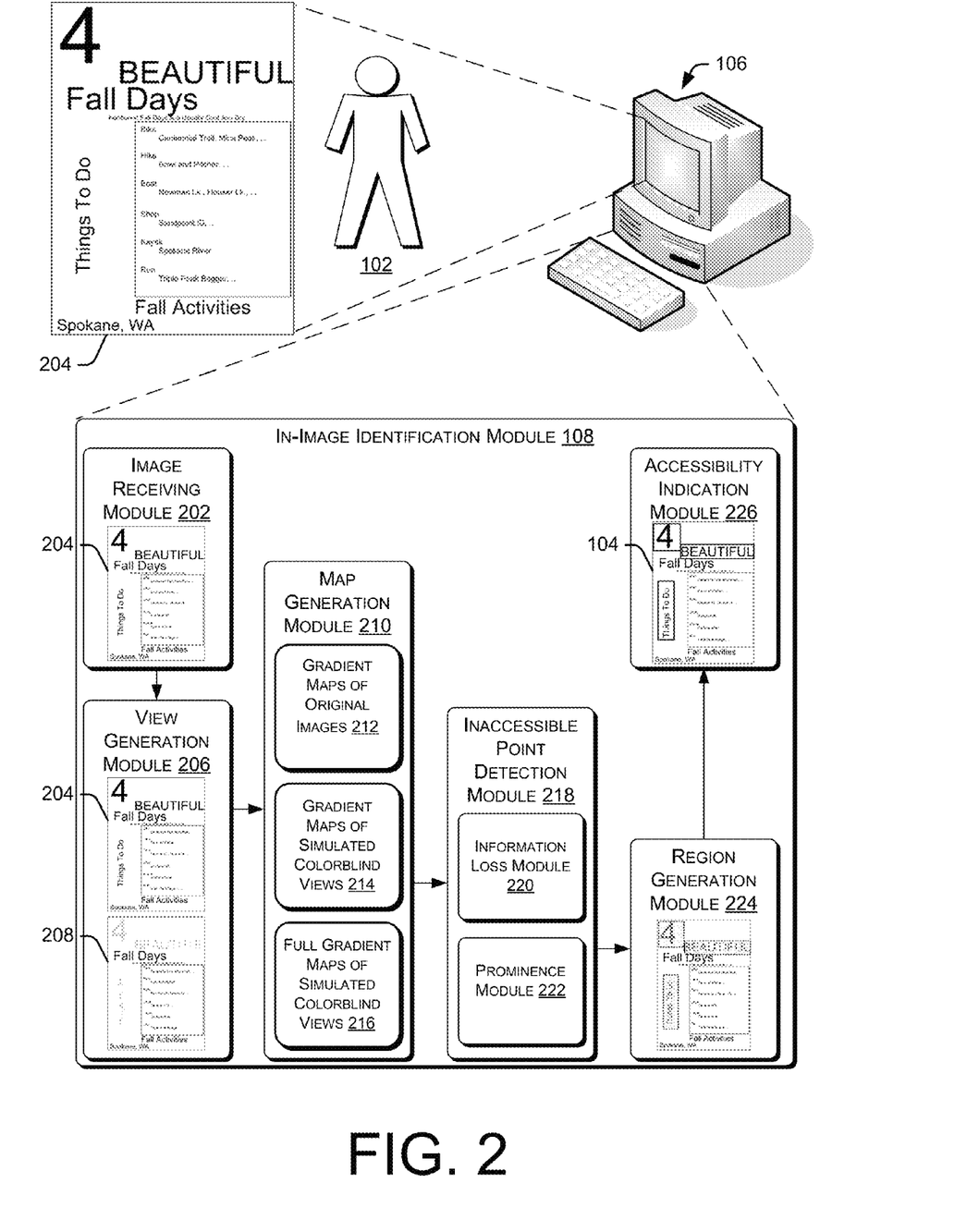
FIG. 2 is a block diagram of an example in-image accessibility indication module being utilized by the computing system in FIG. 1.

FIG. 2 is a block diagram of an example in-image accessibility indication module being utilized by the computing system in FIG. 1. FIG. 2 illustrates the in-image identification module 108 comprising multiple modules. The modules may be configured to collectively perform acts that when executed by the processor(s) 112 identify and indicate inaccessible regions to the designer 102. In this example, FIG. 2 illustrates an image receiving module 202 for receiving an original image 204 that the designer 102 is currently creating on computing device 106. FIG. 2 also illustrates that the in-image identification module 108 includes a view generation module 206, which may receive the image 204 from image receiving module 202 and generate a simulated colorblind view 208 of the image 204. FIG. 2 further illustrates a map generation module 210, which is configured to generate a set of gradient maps. Here, FIG. 2 illustrates the map generation module 210 generating one or more gradient maps of original images 212 (e.g., partial gradient maps), one or more gradient maps of simulated colorblind views 214 (e.g., partial gradient maps), and one or more full gradient maps of simulated colorblind views 216.

To do so, the map generation module 210 may receive the original image 204 from view generation module 206 and may process the original image 204 to generate the gradient maps of original images 212. Similarly, the map generation module 210 may receive the simulated colorblind views 208 from view generation module 206 and may process the simulated colorblind view 208 to generate the gradient maps of simulated colorblind views 214. The map generation module 210 may further receive the simulated colorblind views 208 to generate the full gradient maps of simulated colorblind views 216.

In some instances, the map generation module 210 may be configured to generate the gradient maps based on dichromate viewers. Specifically, the map generation module 210 may be configured to estimate gradient maps based on protanopia and deuteranopia colorblind viewers (e.g., red-green colorblind viewers). For example, because information loss of protanopia and deuteranopia mainly comes from the a* channel in LAB color space, the map generation module 210 may generate gradient maps in the a* channel. More specifically, the map generation module 210 may generate gradient maps in a* channel of the original images 212, and gradient maps in a* channel of the simulated colorblind views 214 utilizing the following equations, respectively:

$$GA(i, j) = \sqrt{(a(i+1, j) - a(i, j))^2 + (a(i, j+1) - a(i, j))^2} \quad (1)$$

$$GA'(i, j) = \sqrt{(a'(i+1, j) - a'(i, j))^2 + (a'(i, j+1) - a'(i, j))^2} \quad (2)$$

Here, $a(i,j)$ and $GA(i,j)$ are the values of the a* component and the gradient at $(i,j)$-th pixel in the original image 204, and $a'(i, j)$ and $GA'(i, j)$ are the corresponding values in its colorblind view 208. Further, map generation module 210 may generate full gradient maps in l*, a*, and b* channels of the simulated colorblind views 216, which the sum of the gradient maps of l*, a*, and b* channels is $G'(i,j)$.

FIG. 2 further illustrates that the in-image identification module 108 may include an inaccessible point detection module 218. Inaccessible point detection module 218 may be configured to identify inaccessible points in the image 204. Inaccessible point detection module 218 may comprise an information loss module 220 and a prominence module 222. Information loss module 220 may be configured to determine information loss between the original view 204 and the simulated colorblind views 208, determine information loss between the set of gradient maps 212, 214, and 216, and/or determine information loss between gradient maps based on dichromate viewers. As discussed above, because information loss of protanopia and deuteranopia mainly comes from the a* channel in LAB color space, the information loss module 220 may be configured to determine information loss between gradient maps in a* channel of the original images 212 and the gradient maps in a* channel of the simulated colorblind views 214. For example, the information loss module 220 may be configured to estimate information loss around a point (i, j) as $GA(i,j)-GA'(i,j)$. The information loss module 220 may further compare each point's computed information loss to a predefined threshold to determine whether the information loss is sufficient enough to warrant further consideration of the point. That is, when the module 220 determines that a point has significant amount of information loss when viewed by a colorblind viewer, the module 220 may further analyze this point to determine whether a colorblind view would indeed have difficulty in viewing and/ or comprehending the point. In some instances, the designer 102 may set the threshold, or the threshold may be set in any other manner.

For those points that have an information loss that is greater than the predefined threshold, the prominence module 222 may be configured to determine whether these points are prominent enough or not to be properly understood by a colorblind viewer. That is, despite the fact that a particular point of an image may have significant information loss, this point may still be prominent enough (e.g., due to the contrast of pixels surrounding the point) such that a colorblind viewer would still be able to view and comprehend the point. Those points that both have significant information loss and that are not prominent beyond a threshold may then be considered inaccessible points, as discussed below. Also as discussed below, a collection of these points may define an inaccessible region, which the module 108 may indicate to the designer 102 to allow the designer 102 to modify the image, if chosen.

In some instances, the prominence module 222 may be configured to determine if points (i, j) or pixels within full gradient maps in l*, a*, and b* channels of the simulated colorblind views 216 are not prominent in colorblind view. The inaccessible point detection module 218 may first utilize the information loss module 220 to determine if points around which patches do not only have significant information loss but also utilize the prominence module 222 to determine if the points around which the patches are not prominent in colorblind view, as determined with reference to a threshold. Specifically, the inaccessible point detection module 218 may utilize the information loss module 220 and the prominence module 222 to determine the following criterion:

Criterion: point (i, j) is inaccessible if GA(i,j)− GA'(i,j) > T$_1$ and G'(i,j) < T$_2$, where T$_1$ and T$_2$ are two pre-defined thresholds.

FIG. 2 further illustrates in-image identification module 108 comprising a region generation module 224. Region generation module 224 may be configured to locate inaccessible regions based on the identified inaccessible points detected by the inaccessible point detection module 218. Generally, the region generation module 224 finds a set of inaccessible regions R={R$_1$, R$_2$, ..., R$_m$} that cover the identified inaccessible points. However, the region generation module 224 may further optimize the inaccessible regions by iteratively determining a minimum area size of the inaccessible regions versus a regularized number of inaccessible regions. For example, region generation module 224 may determine the optimum number of inaccessible regions to be 3 inaccessible regions, each having a different area size and shape. Specifically, the region generation module 224 may be configured to utilize the following five step clustering algorithm to iteratively minimize an area of each located inaccessible region and regularize a number of the located inaccessible regions:

1: Start with n regions, and each region covers only one point, i.e., S(R$_i$) = 0. Clearly, we have f$^{(0)}$(R) = λn.
2: Search the two regions according to the criterion that {R$_i$, R$_j$} = min$_{i,j}$ S(R$_i$ + R$_j$) − S(R$_i$) − S(R$_j$) where R$_i$ + R$_j$ means the smallest rectangular region that covers R$_i$ and R$_j$.
3: Remove R$_i$ and R$_j$ from R and add in R$_i$ + R$_j$, and let f$^{(k)}$(R) =

$$f^{(k-1)}(R) + \frac{S(R_i + R_j) - S(R_i) - S(R_j)}{A} - \lambda.$$

4: Repeat steps (2) and (3) until k = m − 1, i.e., there is only one region.
5: Select k that minimizes f$^{(k)}$ (R), i.e., the step in which the objective function achieves the minimal value, where $$f(R) = \sum_{i=1}^{m} \frac{S(R_i)}{A} + \lambda m \text{ and}$$

where A is the size of the whole image and λ > 0 is a weighting factor.

Region generation module 224 may further be configured to refrain from identifying particular located inaccessible regions. For example, region generation module 224 may decide to refrain from identifying a located inaccessible region if the located inaccessible region occupies less than about 25 pixels. While the region generation module may be described as configured to utilize the above five step clustering algorithm, the region generation module may be configured to use any other clustering algorithm suitable for minimizing an area of each located inaccessible region and regularizing a number of the located inaccessible regions. Further, the region generation module may determine inaccessible regions with use of the identified inaccessibility points in any other manner, either with use of clustering techniques or otherwise.

FIG. 2 further illustrates an accessibility indication module 226. The accessibility indication module 226 may receive the located inaccessible regions from the region generation module 224. The accessibility indication module 226 may then indicate the located inaccessible regions to the designer in any suitable manner, such as by producing a boundary line arranged around each of the located inaccessible regions. The accessibility indication module 226 may further indicate these bounded regions with a "flag." For example the accessibility indication module 226 may bound the inaccessible regions with a rectangle, an ellipse, or an irregular shape, and/or may further include a "balloon" tagged to each respective bounded region. The "balloon" may include a number, a letter, or the like to indicate the inaccessible regions to the designer. Further, the accessibility indication module 226 may then provide these indications in an image being created by a designer, as illustrated in FIG. 1.

Illustrative In-Image Accessibility Indication Process

Figure 3:
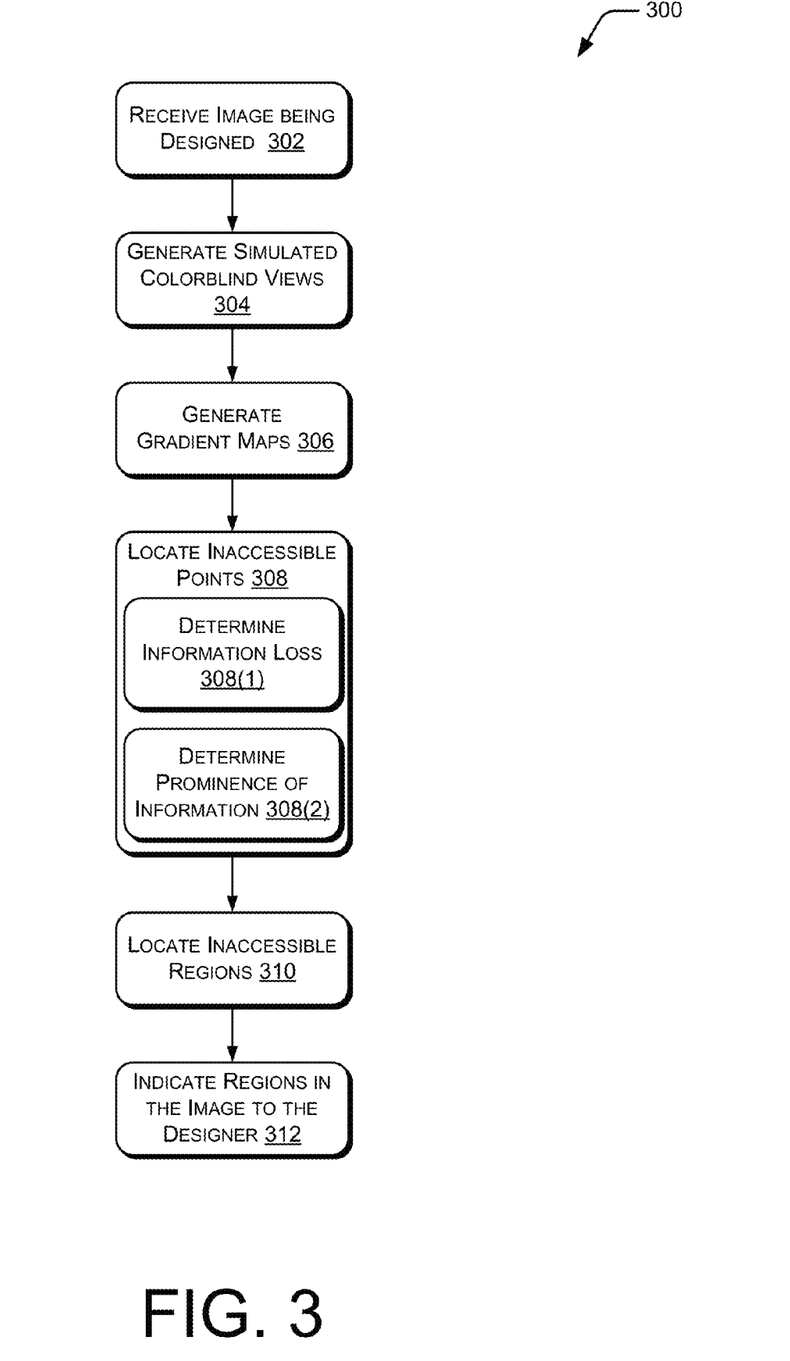
FIG. 3 is a flowchart illustrating details of a process of in-image accessibility indication of FIG. 1.

FIG. 3 is a flowchart illustrating details of a process 300 of in-image accessibility indication of FIG. 1. Generally, in-image accessibility indication may comprise detecting inaccessible points, locating inaccessible regions with reference to the detected inaccessible points, and then indicating these located regions to the designer while the designer creates the image and without requiring the designer to specifically request the indication.

This process is illustrated as a collection of acts in a logical flow graph, which represents a sequence of operations that can be implemented in hardware, software, or a combination thereof. In the context of software, the blocks represent computer instructions stored on one or more computer-readable storage media that, when executed by one or more processors, perform the recited operations. Note that the order in which the process is described is not intended to be construed as a limitation, and any number of the described acts can be combined in any order to implement the process, or an alternate process. Additionally, individual blocks may be deleted from the process without departing from the spirit and scope of the subject matter described herein.

In this particular implementation, the process 300 may include block 302, which represents receiving an image (e.g., image 204) being designed by a designer (e.g., designer 102). For example, as shown in FIG. 2, the image 204 being created by designer 102 may be received by the image receiving module 202. FIG. 3 illustrates block 302 may be followed by block 304, which represents generating simulated colorblind views (e.g., simulated color blind views 208). In some instances, the view generation module 206 illustrated in FIG. 2 may perform the block 304.

The process 300 may further include block 306, which represents the map generation module 210 generating gradient maps. For example, the map generation module 210 may generate a set of gradient maps (e.g., gradient maps 212, 214, and 216). For instance, block 306 may represent generating gradient maps based on red-green colorblind viewers, such as gradient maps in a* channel of the original images 204 (i.e., GA(i,j)), gradient maps in a* channel of the simulated colorblind views 208 (i.e., GA'(i,j)), and full gradient maps in l*, a*, and b* channels of the simulated colorblind views 208 (i.e., G'(i,j)). Block 306 may be followed by block 308 in some instances.

Block 308, which may further comprise block 308(1) and block 308(2), represents the inaccessible point detection module 218 locating inaccessible points. Block 308(1) may represent determining information loss and block 308(2) may represent determining prominence of information 308(2) for those points having a certain amount of information loss. Generally, because inaccessible points are defined as the points around which patches in the image are not prominent enough for colorblind views due to loss of color information, the criterion to locate inaccessible points involves determining if points according to the information loss are not prominent in colorblind view beyond a threshold. Specifically, subsequent to determining information loss by determining points (i, j) are inaccessible if $GA(i,j)-GA'(i,j)>T_1$ at block 308(1), block 308(2) may determine that points (i, j) are inaccessible if $G'(i,j)<T_2$. If the inaccessible point detection module 218 determines that the points (i, j) of GA(i,j)-GA'(i, j) are greater than $T_1$, and that the points (i, j) of G'(i,j) are less than $T_2$, then the points (i, j) are determined to be inaccessible to colorblind persons. While this process describes first determining whether a point has information loss beyond a threshold ($T_1$) and then determining whether the prominence of this point is less than a threshold ($T_2$), in other instances the process may reverse these operations. That is, the process 300 may identify those points having a prominence that is below the threshold $T_2$, and then determine whether the information loss for those points is greater than the threshold $T_1$. In both instances, the process 300 identifies points that colorblind users may have difficulty viewing.

Subsequent to block 308, process 300 may include block 310, which represents region generation module 224 locating inaccessible regions based on the detected inaccessible points. Specifically, block 310 may represent the region generation module 224 iteratively determining a set of inaccessible regions that cover the inaccessible points by utilizing the five step clustering algorithm described above with respect to the region generation module 224 of FIG. 2. Block 312 may complete process 300, which represents the accessibility indication module 226 indicating regions in the image to the designer. For example, the accessibility indication module 226 may form a rectangular shaped boundary line arranged around each of the located inaccessible regions and then provide these regions in an image being created by a designer. While one example has been given, the accessibility indication module 226 may indicate these inaccessible regions in any other visual or audible way in some instances.

Figure 4A:
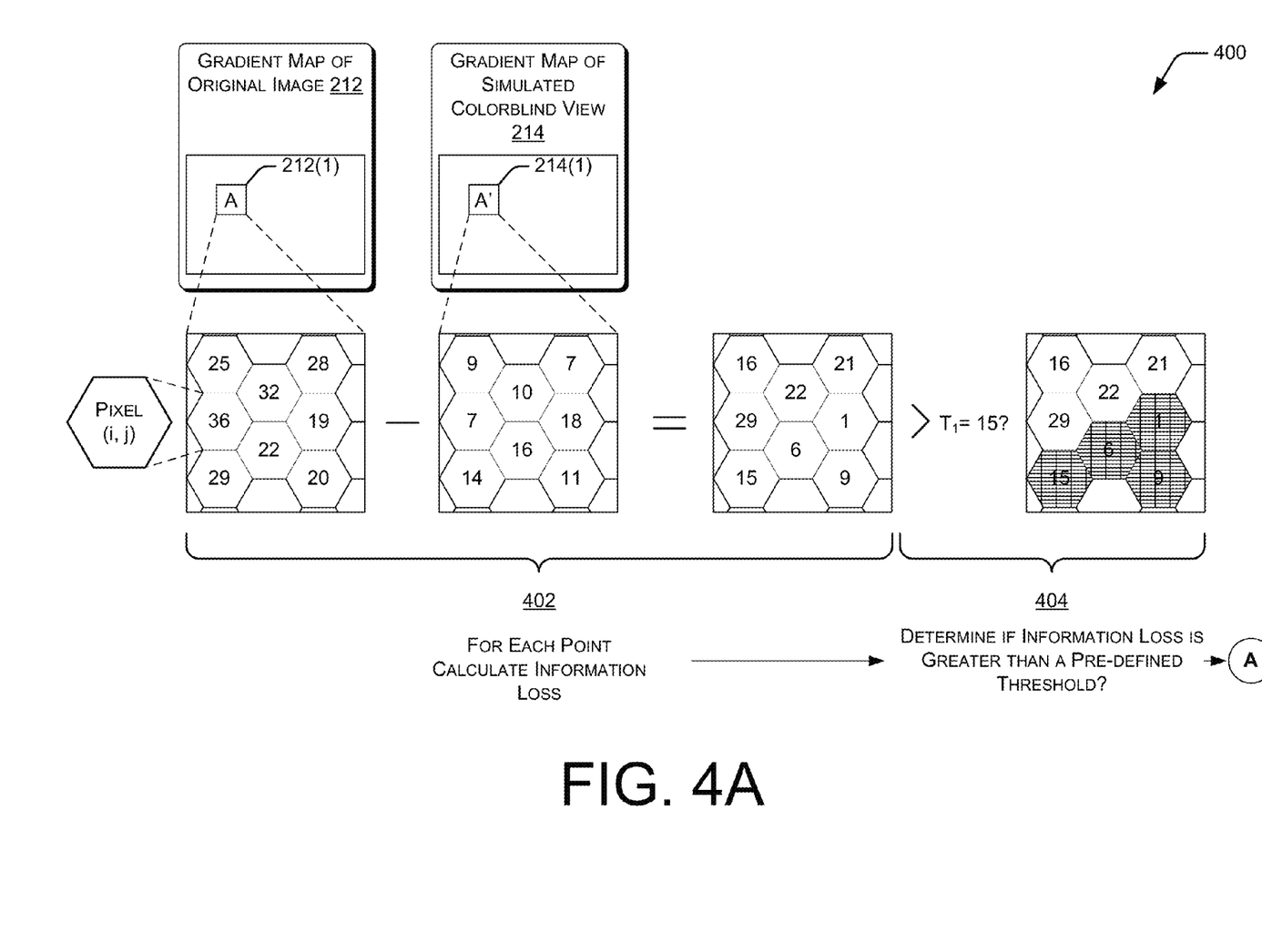
FIGS. 4A-C show a flowchart illustrating the process of locating inaccessible points, locating inaccessible regions, and indicating these regions in the image to a designer.
Figure 4B:
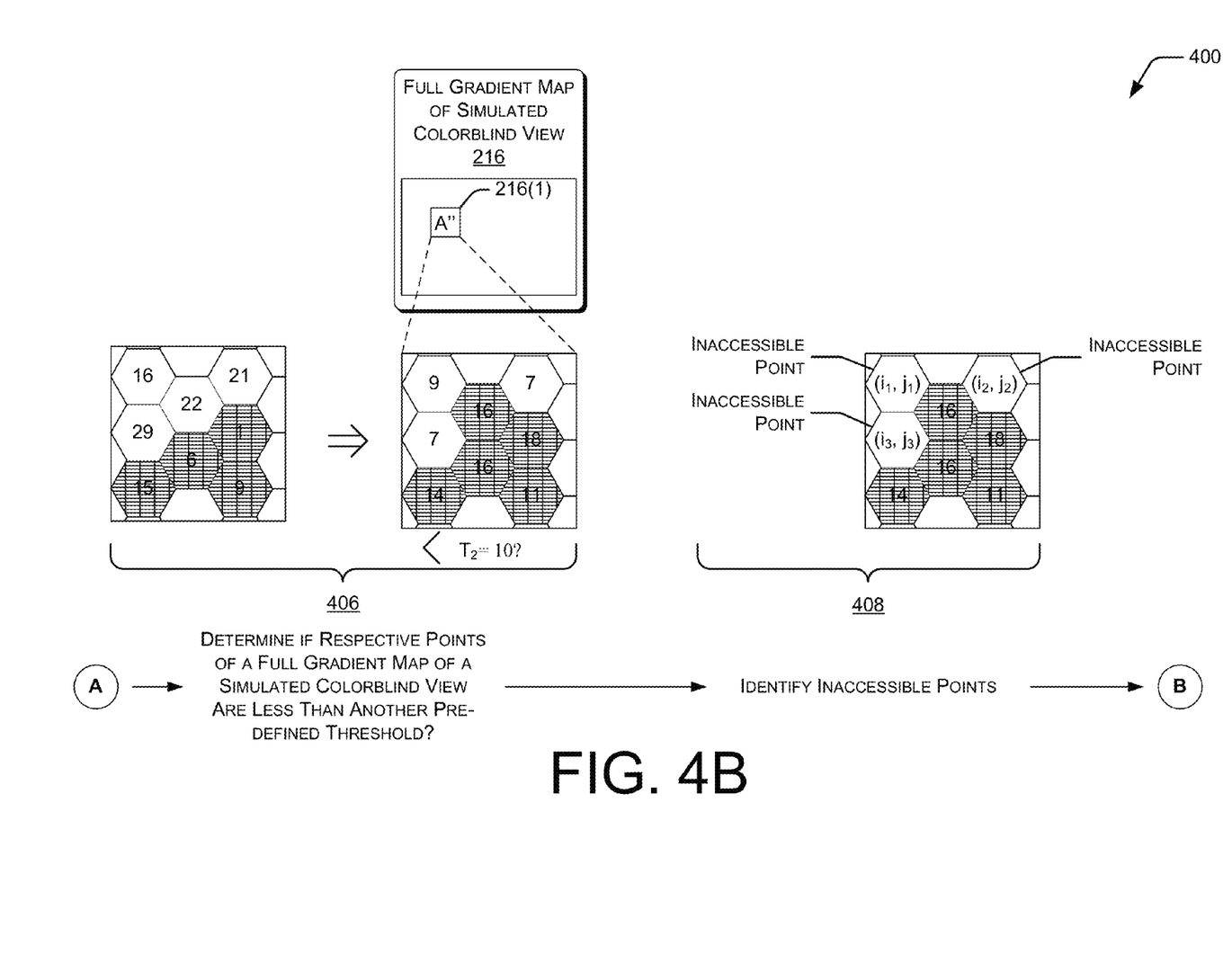
Figure 4C:
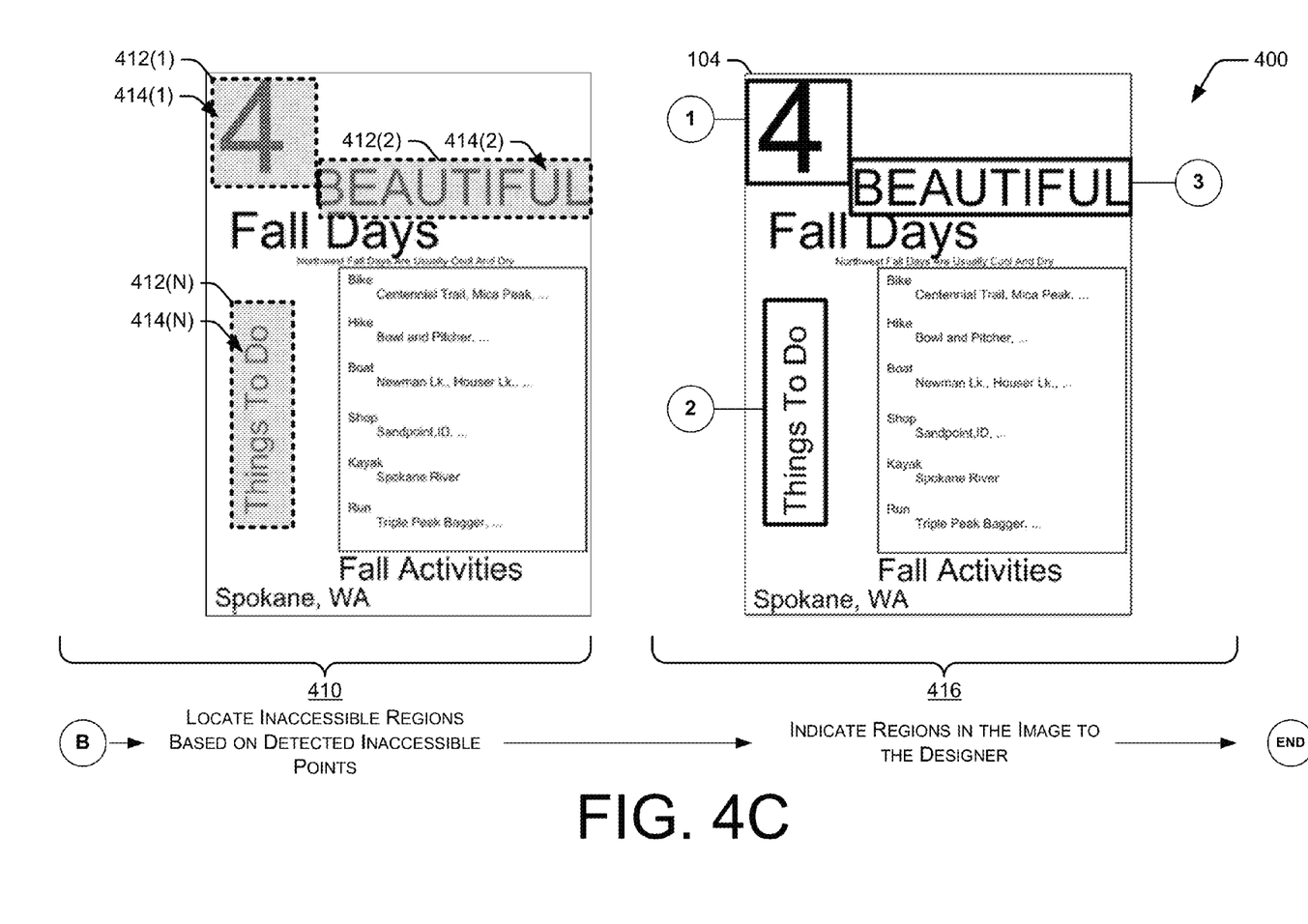

FIGS. 4A-C show a flowchart illustrating a process 400 of locating inaccessible points, locating inaccessible regions, and indicating regions in the image to the designer. Further, the process 400 may represent, in more detail, process 300 blocks 308(1), 308(2), 310, and 312. Generally, FIG. 4A may illustrate the inaccessible point detection module 218 determining information loss between two gradient maps that may have been generated by map generation module 210. FIG. 4B continues the illustration of the process 400, and generally illustrates the inaccessible point detection module 218 identifying inaccessible points. Finally, FIG. 4C illustrates the region generation module 224 locating inaccessible regions based on detected inaccessible points and the accessibility indication module 226 indicating the inaccessible regions in the image to the designer.

Turning to FIG. 4A, the process 400 may start with operation 402, which represents calculating information loss for each point (i, j) between gradient maps. While FIG. 4A illustrates calculating information loss for each point (i, j) between gradient maps, FIG. 4A may also illustrate determining information loss by determining, for each point (i, j), if $GA(i,j)-GA'(i,j)>T_1$, as discussed above. Here, FIG. 4A illustrates the gradient map of an original image 212 comprising a sample target location 212(1). Sample target location 212(1) represents a group of points or pixels disposed in an image (e.g., image 204) being created by a designer. In this example, the sample target location 212(1) includes eight pixels, each comprising a location (i, j) and a value that is intended to represent a gradient at that point for the respective gradient map. FIG. 4A further illustrates the gradient map of a simulated colorblind view 214 comprising a respective sample target location 214(1). Again, for illustrative purposes only, the respective target location 214(1) also includes eight pixels, each comprising the same locations (i,j) as the sample target location 212(1) pixels and a respective value. As discussed above, information loss module 220 may be configured to estimate information loss around a point (i, j) as $GA(i,j)-GA'(i,j)>T_1$. Here, operation 402 illustrates determining the difference for each of the eight pixels between the gradient map of the original image 212 and the gradient map of the simulated colorblind image 214, respectively, to determine GA(i,j)-GA'(i,j).

Operation 402 is followed by operation 404, which represents determining if the information loss is greater than a predefined threshold (i.e., $GA(i,j)-GA'(i, j)>T_1$). Operation 404 illustrates that four of the eight pixels are greater than the predefined threshold $T_1$, while the remaining four pixels are not greater than the predefined threshold $T_1$ (which are grated out). The pixels that are greater than the predefined threshold are determined to be inaccessible-point candidates, subject to determining the prominence of each of these points. While FIG. 4A illustrates a pre-defined threshold equal to 15, other pre-defined thresholds are contemplated. For example the pre-defined threshold can vary from about 10 to about 20.

The process 400 continues with FIG. 4B at operation 406. Operation 406 may represent the prominence module 222 determining if respective points of a full gradient map of a simulated colorblind view 216 are less than another pre-defined threshold (i.e., if $G'(i,j)<T_2$). Generally, operation 406 represents the prominence module 222 determining if these points are not prominent in colorblind view.

FIG. 4B illustrates a full gradient map of the simulated colorblind view 216 comprising a respective sample target location 216(1). Respective target location 216(1) may also comprise eight complete pixels, each comprising the same locations (i,j) as the sample target location 212(1) pixels, respectively, and a value. Here, operation 406 illustrates considering only the four pixel locations (i, j) of the sample target location 212(1) that are not grated out, since these are the inaccessible-point candidates determined at the operation 404. Next, operation 406 determines if the respective target location 216(1) pixels are less than another pre-defined threshold $T_2$. More specifically, operation 406 may represent determining if $G'(i, j) < T_2$.

Operation 408, which may follow operation 406, represents the inaccessible point detection module 218 identifying the inaccessible points. Here, at operation 408, the respective target location 216(1) pixels that are less than the other pre-defined threshold $T_2$ are identified as inaccessible points. While FIG. 4B illustrates another pre-defined threshold equal to 10, other pre-defined thresholds are contemplated. For example the other pre-defined threshold can vary from about 10 to about 20.

The process 400 continues with FIG. 4C at operation 410. Generally, operation 410 represents optimizing the inaccessible regions by iteratively determining an area size of the inaccessible regions versus the number of inaccessible regions. Operation 410 may represent the region generation module 224 locating boundaries 412(1)-412(N) arranged around inaccessible regions based on detected inaccessible points 414(1)-414(N), respectively. Here detected inaccessible points 414(1)-414(N) may have been identified at operation 408 as described above. Further, operation 410 may represent the region generation module 224 utilizing the five step iterative clustering algorithm, described above with respect to FIG. 2, to iteratively regularize the number of boundaries 412(1)-412(N) arranged around inaccessible regions and minimize their area sizes.

The process 400 may be completed at operation 416, which represents the accessibility indication module 226 indicating inaccessible regions 1-3 in the image being immediately created by a designer (e.g., designer 102). Again, the accessibility indication module 226 may indicate these regions to the designer in any other suitable manner. Further, in some instances, the in-image identification module 108 performs the process 400 while the designer creates the image and without the designer executing a command or other request to view the inaccessible regions. Instead, the module 108 may perform this background process while the designer designs the image.

Illustrative Computing Environment

Figure 5:
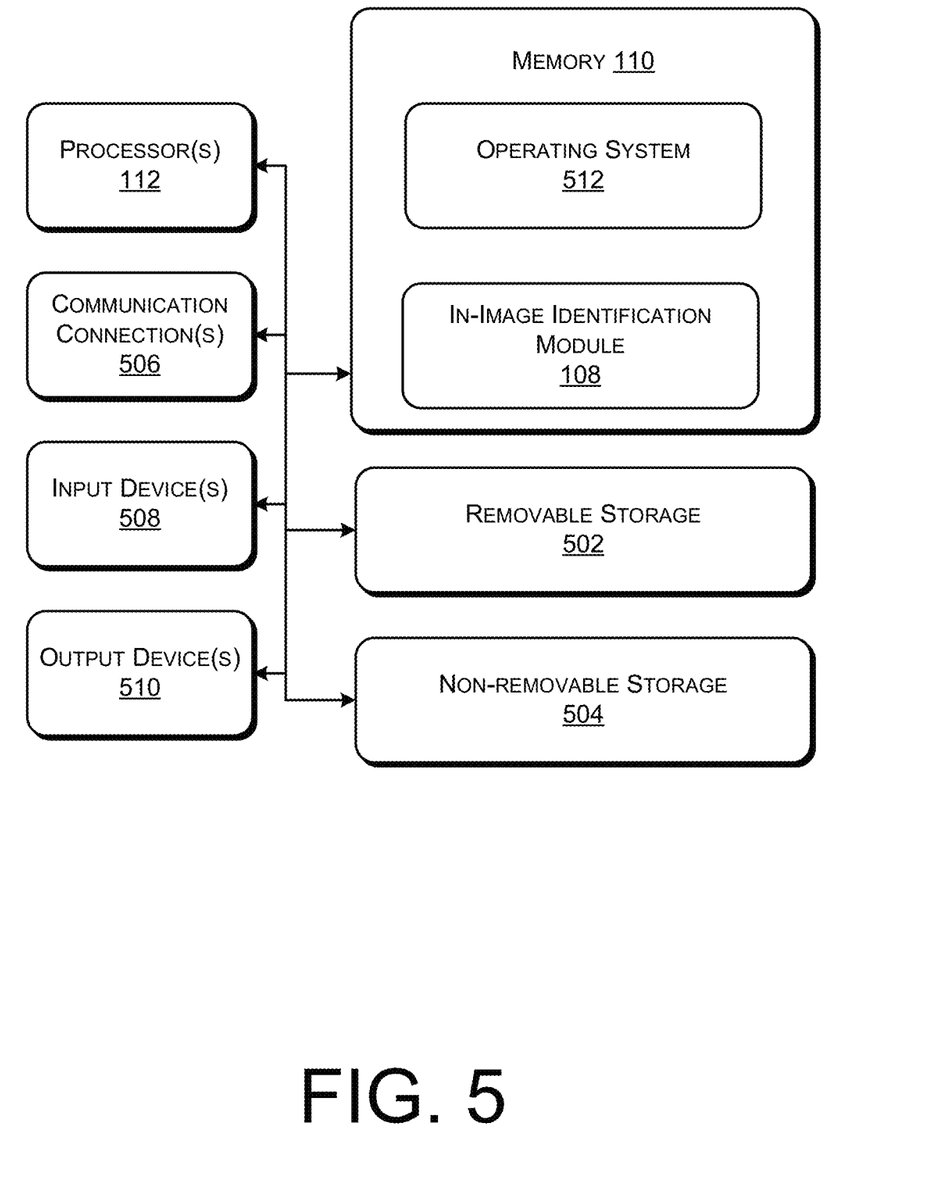
FIG. 5 is a block diagram of a computing system in which in-image accessibility indication can be implemented.

FIG. 5 is a block diagram of a computing system that may implement the in-image accessibility indication techniques described above. The computing system may be configured as any suitable computing device capable of implementing in-image accessibility indication system, and accompanying processes. By way of example and not limitation, suitable computing devices may include personal computers (PCs), servers, server farms, datacenters, or any other device capable of storing and executing all or part of the in-image accessibility indication processes.

In one illustrative configuration, the computing system may comprise at least a memory 110 and one or more processing units (or processor(s)) 112. The processor(s) 112 may be implemented as appropriate in hardware, software, firmware, or combinations thereof. Software or firmware implementations of the processor(s) 112 may include computer-executable instructions written in any suitable programming language to perform the various functions described.

Memory 110 may store program instructions that are loadable and executable on the processor(s) 112, as well as data generated during the execution of these programs. Depending on the configuration and type of computing device, memory 110 may be volatile (such as random access memory (RAM)) and/or non-volatile (such as read-only memory (ROM), flash memory, etc.). The computing device or server may also include additional removable storage 502 and/or non-removable storage 504 including, but not limited to, magnetic storage, optical disks, and/or tape storage. The disk drives and their associated computer-readable media may provide non-volatile storage of computer readable instructions, data structures, program modules, and other data for the computing devices. In some implementations, the memory 110 may include multiple different types of memory, such as static random access memory (SRAM), dynamic random access memory (DRAM), and/or ROM.

Memory 110, removable storage 502, and non-removable storage 504 are all examples of computer-readable storage media. Computer-readable storage media includes, but is not limited to, volatile and non-volatile, removable and non-removable media implemented in any method or technology for storage of information such as computer-readable instructions, data structures, program modules or other data. Additional types of computer storage media that may be present include, but are not limited to, phase chance memory (PRAM), SRAM, DRAM, other types of RAM, ROM, electrically erasable programmable read-only memory (EEPROM), flash memory or other memory technology, compact disc read-only memory (CD-ROM), digital versatile disks (DVD) or other optical storage, magnetic cassettes, magnetic tape, magnetic disk storage or other magnetic storage devices, or any other medium which can be used to store the desired information and which can be accessed by the server or other computing device. Combinations of any of the above should also be included within the scope of computer-readable storage media.

The computing system may also contain communications connection(s) 506 that allow the computing system to communicate with a stored database, another computing device or server, user terminals, and/or other devices on a network. The computing system may also include input device(s) 508 such as a keyboard, mouse, pen, voice input device, touch input device, etc., and output device(s) 510, such as a display, speakers, printer, etc.

Conclusion

Although embodiments have been described in language specific to structural features and/or methodological acts, it is to be understood that the disclosure is not necessarily limited to the specific features or acts described. Rather, the specific features and acts are disclosed as illustrative forms of implementing the embodiments.

What is claimed is:

1. A computing system comprising:
one or more processors;
memory;
an image receiving module stored in the memory and executable by the processors to receive an image being created by a designer;
a map generation module stored in the memory and executable by the processors to:
generate a gradient map of the image;
generate a simulated colorblind view of the image, a colorblind gradient map of the simulated colorblind view, and a full colorblind gradient map of the simulated colorblind view;
a detection module stored in memory and executable by the processors to:

determine, for each of multiple pixels of the image, information loss between the non-colorblind gradient map and the colorblind gradient map;

determine a color space value for each of the multiple pixels from the full colorblind gradient map;

locate inaccessible points in the image based at least in part on the determined information loss and the determined color space value;

a region generation module stored in memory and executable by the processors to locate inaccessible regions based at least in part on the located inaccessible points; and an indication module stored in memory and executable by the processors to indicate the located inaccessible regions in the image to the designer.

2. The computing system of claim 1, wherein the generated colorblind gradient map and the non-colorblind gradient map are generated in an a* channel LAB color space, and the full gradient map is generated in a l*, a*, and b* LAB channel color space.

3. The computing system of claim 1, wherein the locating of inaccessible points comprises:

determining, for each of the multiple pixels, if the determined information loss is greater than a first pre-defined threshold; and determining if the color space value for the respective pixel from the full colorblind gradient map is less than a second pre-defined threshold.

4. The computing system of claim 3, wherein the pre-defined threshold for information loss and the color space value comprises a range of approximately about 10 to 20, respectively.

5. The computing system of claim 1, wherein the located inaccessible regions are identified in the image to the designer via a boundary line arranged around each of the located inaccessible regions.

6. The computing system of claim 5, wherein the boundary line arranged around each of the located inaccessible regions comprises a rectangle, an ellipse, or an irregular shape.

7. The computing system of claim 1, wherein the region generation module further calculates, incrementally, a size and a quantity of the located inaccessible regions by:

minimizing an area of each located inaccessible region; and regularizing a number of the located inaccessible regions.

8. The computing system of 1, wherein the region generation module further refrains from identifying a located inaccessible region if it occupies less than about 25 pixels.

9. One or more computer-readable storage media storing computer executable instructions that, when executed, cause one or more processors to perform acts comprising:

receiving an image currently being created by a designer;

automatically generating a set of gradient maps associated with the image;

determining information loss and color space values for points within the image using the set of gradient maps;

locating inaccessible points in the image based at least in part on the determined information loss and the determined color space values;

locating inaccessible regions based at least in part on the located inaccessible points; and identifying the located inaccessible regions in the image via a flag to indicate the located inaccessible regions to the designer while the designer creates the image.

10. The one or more computer-readable storage media of claim 9, wherein:

the automatically generating comprises:

generating a simulated colorblind view of the image and an a* channel color space gradient map of the simulated colorblind view;

generating an a* channel color space gradient map of the image; and generating a full l*, a*, and b* channel color space gradient map from the image or the simulated colorblind view;

determining information loss comprises determining information loss between each respective pixel of the a* channel color space gradient map of the image and the a* channel color space gradient map of the simulated colorblind view; and determining the color space value comprises determining a color space value for each respective pixel of the full l*, a*, and b* channel color space gradient map.

11. The one or more computer-readable storage media of claim 10, wherein the locating of inaccessible points in the image comprises determining, for each of multiple points in the image, if the information loss between the a* channel color space gradient map of the image and the a* channel color space gradient map of the simulated colorblind view is greater than a first pre-defined threshold at the respective point, and if the color space value for the respective point in the full l*, a*, and b* channel color space gradient map is less than a second pre-defined threshold.

12. The one or more computer-readable storage media of claim 9, further comprising minimizing an area size of each inaccessible region, while regularizing a number of the inaccessible regions.

13. The one or more computer-readable storage media of claim 9, wherein identifying the located inaccessible regions in the image via the flag comprises bounding each of the located inaccessible regions with a rectangle to indicate the located inaccessible regions to the designer while the designer creates the image.

14. The one or more computer-readable storage media of claim 9, wherein identifying the located inaccessible regions in the image via the flag comprises bounding each of the located inaccessible regions with an ellipse to indicate the located inaccessible regions to the designer while the designer creates the image, or tagging each of the located inaccessible regions with a balloon to indicate the located inaccessible regions to the designer while the designer creates the image.

15. A computer-implemented method performed at least in part by one or more processors executing computer-executable instructions that are stored in memory, the computer-implemented method comprising:

receiving an image being created by a designer;

identifying, for the designer creating the image, at least one inaccessible region within the image that a colorblind viewer cannot ascertain;

generating a simulated colorblind view of the image;

generating a colorblind gradient map of the simulated colorblind view and a full colorblind gradient map of the simulated colorblind view;

generating a non-colorblind gradient map of the image;

determining, for each pixel of the image, information loss between the non-colorblind gradient map and the colorblind gradient map; and determining a color space value for each respective pixel from the full colorblind gradient map.

16. The computer-implemented method of claim 15, further comprising
   determining information loss between the simulated colorblind view and the image to determine at least one inaccessible point.

17. The computer-implemented method of claim 15, further comprising;
   determining at least one inaccessible point if the determined information loss for the respective pixel is greater than a first pre-defined threshold, and if the color space value for the respective pixel of the full colorblind gradient map is less than a second pre-defined threshold.

18. The computer-implemented method of claim 17, further comprising locating at least one inaccessible region based at least in part on the determined at least one inaccessible point.

19. The computer-implemented method of claim 18, wherein the at least one located inaccessible region is identified to the designer creating the image by a rectangular boundary arranged about the at least one located inaccessible region.

20. The computer-implemented method of claim 15, wherein the generated colorblind gradient map and the non-colorblind gradient map are generated in an a* channel LAB color space, and the full gradient map is generated in a l*, a*, and b* LAB channel color space.

* * * * *